C. H. KOEHLER.
EFFICIENCY INDICATOR FOR ELECTRIC CAR OPERATION.
APPLICATION FILED AUG. 10, 1917.

1,309,204.

Patented July 8, 1919.

UNITED STATES PATENT OFFICE.

CHARLES H. KOEHLER, OF SPRINGFIELD, ILLINOIS.

EFFICIENCY-INDICATOR FOR ELECTRIC-CAR OPERATION.

1,309,204. Specification of Letters Patent. Patented July 8, 1919.

Application filed August 10, 1917. Serial No. 185,607.

*To all whom it may concern:*

Be it known that I, CHARLES H. KOEHLER, a citizen of the United States of America, and a resident of Springfield, Illinois, have invented a new and useful Improvement in Efficiency-Indicators for Electric-Car Operation, which invention is fully set forth in the following specification.

This invention relates to a device for obtaining directly from an indicating mechanism the efficiency of operation, and indirectly the total distance traveled, of electrically propelled vehicles.

The object is to provide means for registering the algebraic sum of the "power on" and the "power off" distances traveled by the vehicle (the "power on" distance here meaning the distance traveled with the motive power applied, and "power off" distance meaning the distance traveled with the motive power shut off), thereby giving means of determining the actual efficiency of operation of the vehicle. Another object is to provide means for recording the total distance of travel with the motive power on or with the motive power shut off, as the case may be, thereby affording means for computing the total distance traveled by the vehicle. Other objects of the invention will appear more fully hereinafter.

In the practical operation of vehicles of this kind, it is a well known fact that a very appreciable amount of energy may be wasted by careless and inefficient operators. This energy waste is caused primarily by failure to shut off the power early enough, and by not properly utilizing the kinetic energy of the vehicle. Efficient operation resolves itself into the act of traveling as few miles as possible with power applied, and as many miles as possible with power shut off, while at the same time covering the distance in the required time. Extensive studies have shown that the contour of the speed-time curve (miles per hour plotted against time required to make the run) for a given run is a relative measure of efficiency of energy usage in making the run. It has also been found that efficient operation can be obtained and a minimum of energy consumed by increasing the rates of acceleration and braking to their economical limits. Heretofore various means have been devised to encourage efficient operation through the use of more rapid braking and accelerating rates, but so far as I know, no device has ever been provided to accomplish this purpose by directly registering the difference between the "power on" and "power off" distances.

It is apparent from the foregoing that efficiency of operation can be determined by obtaining the ratio of the "power on" to the "power off" distance, or the ratio of the "power off" to the total distance. The mechanical and psychological advantage of a device that would move an indicating hand around a dial in one direction proportional to the speed of the vehicle while power is applied, and in the reverse direction proportional to the speed of the vehicle while power is shut off, becomes even more apparent.

With such a device, an operator going on duty would set the indicating dial-hand at zero. As he used the power, the hand would rotate in say a counter-clockwise direction, integrating the distance traveled with the power applied. As he shut off the power and coasted, the hand would move in the reverse direction, or clockwise, integrating the distance traveled with the power off. The reading of the indicating dial-hand at the end of a trip or run would represent, therefore, the algebraic sum of the "power on" and "power off" distances, and would thus be a measure of the operator's efficiency in running the vehicle. The psychological effect on the operator would be far greater than merely recording either "power on" or "power off" distances, for as the operator became careless, the hand would rotate in counter-clockwise direction, subtracting from any "power off" distance that he might obtain, and thus remind him that he was wasting energy. The indicating or registering mechanism would be made small, so that it could easily be placed in plain view of the operator at all times. A totaling mechanism geared to record in only one direction could be used to totalize either the "power off" or the "power on" distance, as might be deemed preferable. The ratio of the aforementioned algebraic sum to the total "power off" or total "power on" distance would similarly be a measure of efficiency of operation. The total distance traveled by the vehicle could be readily determined by means of the factors thus obtained.

It is therefore the purpose of this invention to provide means for effecting the registration of the algebraic sum of the "power on" and the "power off" periods by utilizing the propelling motor in combination with a suitable electrically operated registering mechanism. While the vehicle is in motion, the propelling motor is rotating, and the mechanical and the electrical effects of such rotation are employed as the controlling agents for the operation of the registering mechanism.

The inventive idea involved is capable of receiving a variety of mechanical expressions, one of which, for the purpose of illustrating the device, is shown in the accompanying drawings, but it is to be expressly understood that such drawings are for the purpose of illustration only, and are not designed to define the limits of the invention, reference being had to the appended claims for this purpose.

In said drawings—

Figure 1 is a diagrammatic view of an arrangement embodying the invention; and

Fig. 2 is a section on line 2—2 of Fig. 1.

Referring to the drawings, in which like reference numerals indicate like parts, 1 is the motor for propelling the vehicle to which power is applied by the circuit wires 2 and 3, the application of power being controlled by any suitable controller 4. A magnet coil 5 is connected across the terminals 6 and 7 of the motor through the medium of wires 8 and 9. If desired, a plurality of magnet coils may be substituted for the single magnet coil 5. Two armatures 10 and 11 are mounted in proximity to the magnet coil 5, and are electrically connected by a conducting spiral 12. A retracting spring 13 is connected to the armature 10, and a stronger retracting spring 14 is connected to the armature 11, suitable adjusting means being provided to adjust the tension of said springs. When current is admitted to the motor 1, the magnet coil 5 is energized and acts to draw each of the armatures 10 and 11 against the tension of their respective springs toward the magnet coil. When current is cut off from the motor 1, the power of the magnet coil 5 is overcome by the tension of the spring 14, and the armature 11 is withdrawn, but the residual field of motor 1 generates a low voltage sufficient to cause the magnet coil 5 to hold armature 10 against the tension of spring 13 as long as the vehicle is in motion. When, however, the vehicle stops, and the motor therefore comes to rest, it no longer acts as a generator, and the armature 10 is withdrawn by the tension of spring 13 into the position shown in Fig. 1.

Any suitable source of electrical energy, as for example, a trolley-wire 15, is connected by a suitable conductor 16 to a contact 17, located opposite a contact 18 on the armature 10. Two magnet coils 19 and 20 are mounted on any suitable support 21, and on opposite sides of an oscillating lever 22 fulcrumed at 23 to said support, said lever being provided with armatures 24 and 25 opposite the respective magnet coils 19 and 20. The lever 22 is forked at its top, the two forks being provided with actuating pawls 26 and 27 engaging a ratchet wheel 28 keyed to a shaft 29 mounted in the support 21. The armature 11 is provided with a contact 30, on the opposite sides of which are two contacts 31 and 32. From the contact 32 a conductor 33 leads through coil 20 and conductors 34 and 35 to brush 36 on interrupter 37 mounted to revolve when the vehicle is in motion, and at a rate proportional to the speed thereof.

The periphery of the interrupter is insulated except at the segment 38, which is made of conducting material in electrical connection through the earth or other conducting medium with the source of current 15. From contact 31 a conductor 39 leads through the electrical coil 19 to the conductor 35.

When current is admitted to the motor 1, the magnet coil 5 is energized, and armatures 10 and 11 are actuated thereby, so as to bring 17 and 18 and 30 and 32 into contact. Under these conditions, the current from the source 15 passes over conductor 16 through contacts 17 and 18, armature 10, conducting spiral 12, armature 11, contacts 30 and 32, conductor 33, coil 20, conductors 34 and 35, to the brush 36, and as the interrupter revolves, it periodically permits the current to pass through conductor 38 back to the current source 15, thus completing the circuit. The result of this is that the coil 20 is periodically energized and deënergized, thus acting to alternately attract and release the armature 25. These impulses effect the rotation of the wheel 28 in a counter-clockwise direction.

When power to motor 1 is shut off and the vehicle is still in motion, the voltage generated due to the residual field is so small as to cause the magnet coil to act with decreased power on the armatures 10 and 11. The spring 14 is sufficient to overcome this power and withdraw armature 11 so as to separate the contacts 30 and 32 and close contacts 30 and 31, but it is sufficient to hold 17 and 18 in contact against the tension of spring 13. Under these conditions, current flows from the source 15 over conductor 16, contacts 17 and 18, armature 10, conducting spiral 12, armature 11, contacts 30 and 31, conductor 39, magnet coil 19 and conductors 34' and 35 to the brush 36. Under these conditions the magnet coil 19 acts through the armature 24 to impart oscillation to the lever 22, and moves the wheel 28 in clockwise direction, that is, in a reverse direction from that imparted thereto by the magnet coil 20.

Operatively connected to the shaft 29, either by being keyed thereto or through suitable gears as may be desired, is a pointer 40 moving around a dial 41 graduated in units of distance. When the vehicle is at rest, and before power is applied to the motor, the pointer 40 is adjusted to the zero position, as shown in the drawing. When power is applied to the motor, the shaft 29, and consequently the pointer 40, will rotate counter-clockwise and register the distance traveled with "power on". If, then, power is shut off, and the vehicle continues its movement, the shaft 29, and consequently the pointer 40, will move clockwise until the vehicle comes to rest or power is again applied, at which instant the position of the pointer 40 with relation to the zero point will register the algebraic sum of the "power on" and "power off" travel.

A second dial 42 graduated in units of distance is mounted on a shaft 43 so connected to the shaft 29 that it will revolve with the latter shaft in one direction, but will not revolve with it in the opposite direction. Any suitable means for effecting this connection may be employed. As here shown, this connection is effected through the well-known ball clutch mechanism 44, shown in section in Fig. 2, in which 45 is a cup rigidly secured to the shaft 29, and 46 is a disk keyed to the shaft 43 and provided with peripheral pockets 47 so formed that when the balls 48 are in the enlarged ends thereof, as shown in Fig. 2, the cup 45 revolves freely without revolving the disk 46. When, however, the shaft 29, and with it the cup 45, revolves in the reverse direction, that is, in the direction indicated by the arrow in Fig. 2, the balls 48 are carried by the cup into the restricted ends of the pockets 47, and act to clutch the disk and the cup, and thereby the shafts 29 and 43, together, and cause them to revolve as one.

The result of this construction is that when the shaft 29 is moving the reverse of clockwise, the pointer 49 on the shaft 43 remains stationary, because shaft 43 is not revolved. On the other hand, when the shaft 29 is revolved in clockwise direction, shaft 43, and with it the pointer 49, is also revolved clockwise. The result of this is that the pointer 49 registers the revolutions of the shaft 29 in a clockwise direction, and in that direction only. As here shown, this would result in the pointer 49 registering the distance traveled with power shut off. But it will be readily understood that by a mere change in the clutch mechanism so that the shaft 43 revolved with the shaft 29 when the latter moved counter-clockwise, and did not revolve with the shaft 29 when the latter moved clockwise, the pointer 49 could be caused to register the distance traveled with "power on" and only with power on.

From the foregoing, it will be apparent that I have provided simple and efficient means for registering the algebraic sum of the distances traveled with the "power on" and "power off", and also equally simple and efficient means for registering the distance traveled with "power on" or "power off", as may be desired, and that these two factors afford ample means, as hereinbefore explained, for determining the efficiency of operation and the total distance traveled.

What is claimed is:—

1. In a device of the character described, the combination of a vehicle-propelling electric-motor, electromagnetic mechanism having energizing circuits therefor, said mechanism indicating the algebraic sum of the distance traveled with "power on" and "power off" said motor and for registering the distance traveled while the motor runs under power or as a generator, and switch means controlled by said motor for controlling said circuits.

2. In an electrically operated apparatus for indicating and registering the algebraic sum of the distance traveled with motive power shut off and the distance traveled with motive power applied, and for registering the distance traveled with "power off," the combination of a vehicle-propelling motor, electrically operated indicating and registering mechanism, electrical devices for controlling same, a circuit for said electrical devices, and a magnet coil connected across the terminals of the propelling motor for controlling the operation of said registering mechanism.

3. In an electrically operated apparatus for indicating and registering the algebraic sum of, or the arithmetic difference between the distance traveled by a vehicle with motive power shut off and the distance traveled with motive power applied, and for registering the distance traveled with power shut off, the combination of a vehicle-propelling electric-motor, electrically operated indicating and registering mechanism, electrical devices for controlling the same, a circuit for said electrical devices, and contacts arranged in said circuit to be closed only while motive power is applied.

4. In combination, a vehicle-propelling motor, electromagnetically operated indicating and registering mechanisms, energizing circuits therefor including a plurality of switch contacts and a circuit interrupter, motor-controlled switching means adapted to close one or the other of said circuits through said interrupter in response to the motor being driven by current or running as a dynamo.

5. In an apparatus of the character described, the combination of a vehicle-propelling electric motor, an electromagnet in a shunt circuit of said motor, means indicating the algebraic sum of the distances traveled with power on and with power off said motor, reversible electromagnetic driving means for said indicating means, circuit controlling means for said driving means controlled by said shunt circuit magnet, and distance-indicating means responsive to said driving means when operating in one direction only.

6. In an apparatus of the character described, the combination of a vehicle-propelling electric-motor and an electrically operated indicating and registering mechanism, electrical devices for controlling the same, a circuit for said electrical devices, and means included in said circuit for operating said indicating and registering mechanism in one direction while power is applied, and in the reverse direction while the vehicle is traveling with "power off."

In testimony whereof I have signed this specification.

CHARLES H. KOEHLER.

Copies of this patent may be obtained for five cents each, by addressing the "Commissioner of Patents, Washington, D. C."